(12) United States Patent
Saban et al.

(10) Patent No.: US 12,401,391 B2
(45) Date of Patent: Aug. 26, 2025

(54) SYSTEM AND METHOD FOR SUB-NYQUIST SYNCHRONIZATION TO A RECEIVED SIGNAL IN AN IMPLUSE RADIO ULTRA-WIDE BAND REVEIVER

(71) Applicant: CEVA TECHNOLOGIES, LTD, Herzlia Pituach (IL)

(72) Inventors: Cfir Saban, Herzelia (IL); Alexander Yufit, Holon (IL)

(73) Assignee: CEVA TECHNOLOGIES, LTD, Herzlia Pituach (IL)

( * ) Notice: Subject to any disclaimer, the term of this patent is extended or adjusted under 35 U.S.C. 154(b) by 260 days.

(21) Appl. No.: 18/173,213

(22) Filed: Feb. 23, 2023

(65) Prior Publication Data

US 2024/0291514 A1    Aug. 29, 2024

(51) Int. Cl.
*H04B 1/71* (2011.01)
*H04B 1/7183* (2011.01)

(52) U.S. Cl.
CPC .................................. *H04B 1/7183* (2013.01)

(58) Field of Classification Search
CPC ................................................... H04B 1/7183
USPC ........................................................ 375/142
See application file for complete search history.

(56) References Cited

U.S. PATENT DOCUMENTS

| | | |
|---|---|---|
| 7,974,329 B2 | 7/2011 | Huang et al. |
| 8,369,379 B2 | 2/2013 | Ye et al. |
| 8,437,432 B2 | 5/2013 | McLaughlin et al. |
| 9,054,905 B2 | 6/2015 | Sen et al. |
| 10,056,993 B2 | 8/2018 | Clancy et al. |
| 10,075,210 B2 | 9/2018 | Marrow et al. |

(Continued)

FOREIGN PATENT DOCUMENTS

IN           356491           5/2011

OTHER PUBLICATIONS

Wen Fan et al: "Robust, Low-Complexity, and Energy efficient Downlink Baseband Receiver Design for MB-OFDM UWB System" IEEE Transactions on Circuits and Systems I: Regular Perps, IEEE, US, vol. 59, No. 2, Feb. 1, 2012, pp. 399-408, XP011394654, ISSN: 1549-8328 (Year: 2012).*

(Continued)

*Primary Examiner* — Kevin M Burd
(74) *Attorney, Agent, or Firm* — PEARL COHEN ZEDEK LATZER BARATZ LLP

(57) ABSTRACT

A system and method for synchronizing to a received signal in an IR-UWB receiver including sampling the received signal in a frequency that is less than a Nyquist frequency of the received signal; for each part of the sampled received signal that is equal in length to a synchronization symbol: calculating a cross-correlation between the synchronization symbol and the part of the sampled received signal that is equal in length to the synchronization symbol; calculating at least one autocorrelation, where each autocorrelation is performed between the results of the cross-correlation and the results of the cross-correlation delayed by a time lag that equals one or more time-durations of the synchronization symbol; accumulating the results of each of the at least one autocorrelation to obtain at least one coarse synchronization window; and analyzing the at least one coarse synchronization window to detect presence of the synchronization symbol in the received signal.

20 Claims, 10 Drawing Sheets

(56) References Cited

U.S. PATENT DOCUMENTS

| | | | |
|---|---|---|---|
| 10,512,048 B2 | 12/2019 | Isaacs et al. | |
| 2006/0193371 A1* | 8/2006 | Maravic | H03H 17/0213 375/130 |
| 2020/0014574 A1* | 1/2020 | Xu | H04L 27/2675 |

OTHER PUBLICATIONS

Ismail Guvenc et al: "On the Transceiver Types of IR-UWB Systems at Sub- Nyquist Sampling Rates", Wireless Personal Commuications, Kluwer Academic Pulishers, DO, vol. 46, No. 3, Dec. 6, 2007, pp. 329-350, XP01 961 7240, ISSN: 1572-834X (Year: 2007).*

Wen Fan et al: "Robust, Low-Complexity, and Energy efficient Downlink Baseband Receiver Design for MB-OFDM UWB System" IEEE Transactions on Circuits and Systems I: Regular Perps, IEEE, US, vol. 59, No. 2, Feb. 1, 2012, pp. 399-408, XP011394654, ISSN: 1549-8328.

Ismail Guvenc et al: "On the Transceiver Types of IR-UWB Systems at Sub-Nyquist Sampling Rates", Wireless Personal Commuications, Kluwer Academic Pulishers, DO, vol. 46, No. 3, Dec. 6, 2007, pp. 329-350, XP019617240, ISSN: 1572-834X.

Sonom Olonbayar et al: "Performance and design of IR-UWB transceiver baseband for wireless sensors", ULTRA-WIDEBAND, 2009. ICUWB 2009. IEEE International Conference on, IEEE, Piscataway, NJ, USA, Sep. 9, 2009, pp. 809-813, XP031547618, ISBN: 978-1-4244-2930-1.

Dhiman Saurabh et al: "Timing offset estimation using pilot sequence for Uwb- Ir receivers in Elll 802.15.4a channel model", 2015 International Conference on Signal Processig and Communicatoin (ICSC), IEEE, Mar. 16, 2015, pp. 141-146, XP033171967, DOI: 10.1109/ICSPCOM.2015.7150636 [retrieved on Jul. 6, 2015].

Soonkoo Kwon et al: "A joint timing synchronization, channel estimation, and SFD detection for IR-UWB systems", Journal of Communications and Networks, New York, NY, USA, IEEE, US, vol. 14, No. 5, Oct. 1, 2012, pp. 501-509, XP011473058, ISSN: 1229-2370, DOI: 10.1109/JCN.2012.0007.

Carbonelli et al; Synchronization algorithms for UWB signals, article in IEEE Transactions of Communications, vol. 54, No. 2, Feb. 2006, pp. 329-338.

Miri et al; Timing Synchronization in Impulse-Radio UWB: Trends and Challenges, Nanoscale Communication Integrated Circuits (NCIC) Lab University of California, Irvine, California, pp. 221-224, Published Jun. 22, 2008, 2008 Joint 6th International IEEE Northeast Workshop on Circuits and Systems and TAISA Conference.

Ballal et al; Low-Sampling-Rate Ultra-Wideband Digital Receiver Using Equialent-Time Sampling, Sep. 2014.

* cited by examiner

SYSTEM AND METHOD FOR SUB-NYQUIST SYNCHRONIZATION TO A RECEIVED SIGNAL IN AN IMPLUSE RADIO ULTRA-WIDE BAND REVEIVER

FIELD OF THE INVENTION

Embodiments of the invention may relate to a sub-Nyquist synchronization to a received signal in an impulse radio ultra-wide band (IR-UWB) receiver.

BACKGROUND

Ultra-wideband (UWB) is a technology for transmitting information across a wide bandwidth close to or greater than 500 mega Hertz (MHz). Impulse radio ultra-wideband (IR-UWB) uses radio frequency pulses with a very short time-duration (e.g., nano or picoseconds), resulting in a very high bandwidth and a high channel capacity. IR-UWB is considered a promising wireless standard with capabilities to enable several use cases. Except for wireless digital communication, indoor positioning is highly applicable using accurate estimation procedure of the transmitting device's range and azimuth and elevation angles. Additional use cases for UWB include a radar (sensor) for human presence detection, gesture recognition and detection and estimation of respiration and heartbeat rates.

SUMMARY OF THE INVENTION

Embodiments of the present invention include a method and a system (e.g., implemented as a logic circuit) for synchronizing to a received signal in an impulse radio ultra-wide band (IR-UWB) receiver, including sampling the received signal in a frequency that is less than a Nyquist frequency of the received signal; for each part of the sampled received signal that is equal in length to a synchronization symbol: calculating a cross-correlation between the synchronization symbol and the part of the sampled received signal that is equal in length to the synchronization symbol; calculating at least one autocorrelation, wherein each autocorrelation is performed between the results of the cross-correlation and the results of the cross-correlation delayed by a time lag that equals one or more time-durations of the synchronization symbol; accumulating the results of each of the at least one autocorrelation to obtain at least one coarse synchronization window; analyzing the at least one coarse synchronization window to detect presence of the synchronization symbol in the received signal; and synchronizing to the input signal based on the detected synchronization symbol in the received signal.

According to embodiments of the invention, the sampling frequency may be lower than one fourth of the frequency of the received signal.

According to embodiments of the invention, analyzing the at least one coarse synchronization window may include finding a peak in the at least one coarse synchronization window and determining that the synchronization symbol is present if a peak is detected.

According to embodiments of the invention, synchronizing may include: calculating a carrier frequency offset (CFO) between the received signal and a local clock based on a phase of the at least one coarse synchronization window; calculating a timing misalignment between the at least one coarse synchronization window and a location of the synchronization symbol; and compensating for the CFO and the timing misalignment.

According to embodiments of the invention, accumulating the results of each of the at least one autocorrelation may further include, for every predetermined number of accumulations: filtering the at least one coarse synchronization window using an infinite impulse response (IIR) filter to obtain a filtered coarse synchronization window; resetting the at least one coarse synchronization window, and wherein analyzing at least one coarse synchronization window further comprises analyzing the filtered coarse synchronization window.

According to embodiments of the invention, calculating the autocorrelation may include: calculating a first autocorrelation between the results of the cross-correlation and the results of the cross-correlation delayed by a time lag that equals the time-duration of the synchronization symbol to obtain a first autocorrelation window; and calculating a second autocorrelation between the results of the cross-correlation and the results of the cross-correlation delayed by a time lag that equals two time-duration of the synchronization symbol to obtain a second autocorrelation window, and wherein accumulating the results may include: accumulating the results of the first autocorrelation to obtain a first coarse synchronization window; and accumulating the results of the second autocorrelation to obtain a second coarse synchronization window.

Embodiments of the invention may further include calculating a carrier frequency offset (CFO) between the received signal and a local clock based on a phase of the second coarse synchronization window; and resolving ambiguity in the calculated CFO using the phase of the first coarse synchronization window.

According to embodiments of the invention, analyzing the at least one coarse synchronization window may include, for each accumulation of the results of the first autocorrelation: for each sample in the first coarse synchronization window: summing values of the first coarse synchronization window in a cyclic window of a first number of samples around the sample to obtain a first local sum; dividing an amplitude of the first local sum by an average amplitude of the first coarse synchronization window to obtain a first local sum to average value; and determining that a first peak exists for the sample if the first local sum to average value accedes a first threshold, and for each sample in the second coarse synchronization window: summing values of the second coarse synchronization window in a cyclic window of the first number of samples around the sample to obtain a second local sum; dividing an amplitude of the second local sum by an average amplitude of the second coarse synchronization window to obtain a second local sum to average value; and determining that a second peak exists for the sample if the second local sum to average value accedes a second threshold, and determining that the synchronization symbol is present if a first peak and a second peaks are detected.

Embodiments of the invention may include determining that the synchronization symbol is present if in addition to the first peak and the second peak being detected, the phase of the first coarse synchronization window and the phase of the second coarse synchronization window match, if the index of the first peak and the index of the second peak match and if the phase of the first coarse synchronization window and the phase of the second coarse synchronization window converge as the results of the autocorrelations are accumulated.

According to embodiments of the invention, the first threshold and the second threshold may decrease as the number of accumulated symbols increase.

According to embodiments of the invention, a length of each of the at least one autocorrelation equals a length of the synchronization symbol.

Embodiments of the present invention include a method and a system (e.g., implemented as a logic circuit) for synchronizing to a received signal in an ultra-wide band (UWB) receiver, including: sampling the input signal in a frequency that is less than a Nyquist frequency of the received signal; for each time-duration of a synchronization symbol: calculating a cross-correlation between the sampled received signal and the synchronization symbol; calculating an autocorrelation between the results of the cross-correlation and the results of the cross-correlation delayed by a time-durations of the synchronization symbol to obtain a first autocorrelation window; calculating an autocorrelation between the results of the cross-correlation and the results of the cross-correlation delayed by two time-durations of synchronization symbol to obtain a second autocorrelation window; accumulating the first autocorrelation windows to obtain a first coarse synchronization window; detecting peaks in the first coarse synchronization window; accumulating the second autocorrelation window to obtain a second coarse synchronization window; and detecting peaks in the second coarse synchronization window; for each number of time-durations of the synchronization symbol: filtering the first coarse synchronization window using an IIR filter to obtain a first filtered synchronization window; resetting the first coarse synchronization window; detecting peaks in the first filtered synchronization window; filtering the second coarse synchronization window using the IIR filter to obtain a second filtered synchronization window; resetting the first coarse synchronization window; and detecting peaks in the second filtered synchronization window; and analyzing the amplitude and phase of the detected peaks against at least one pass criteria to determine that the peaks represent a detected synchronization symbol; and synchronizing to the received symbol based on the detected synchronization symbol in the received signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
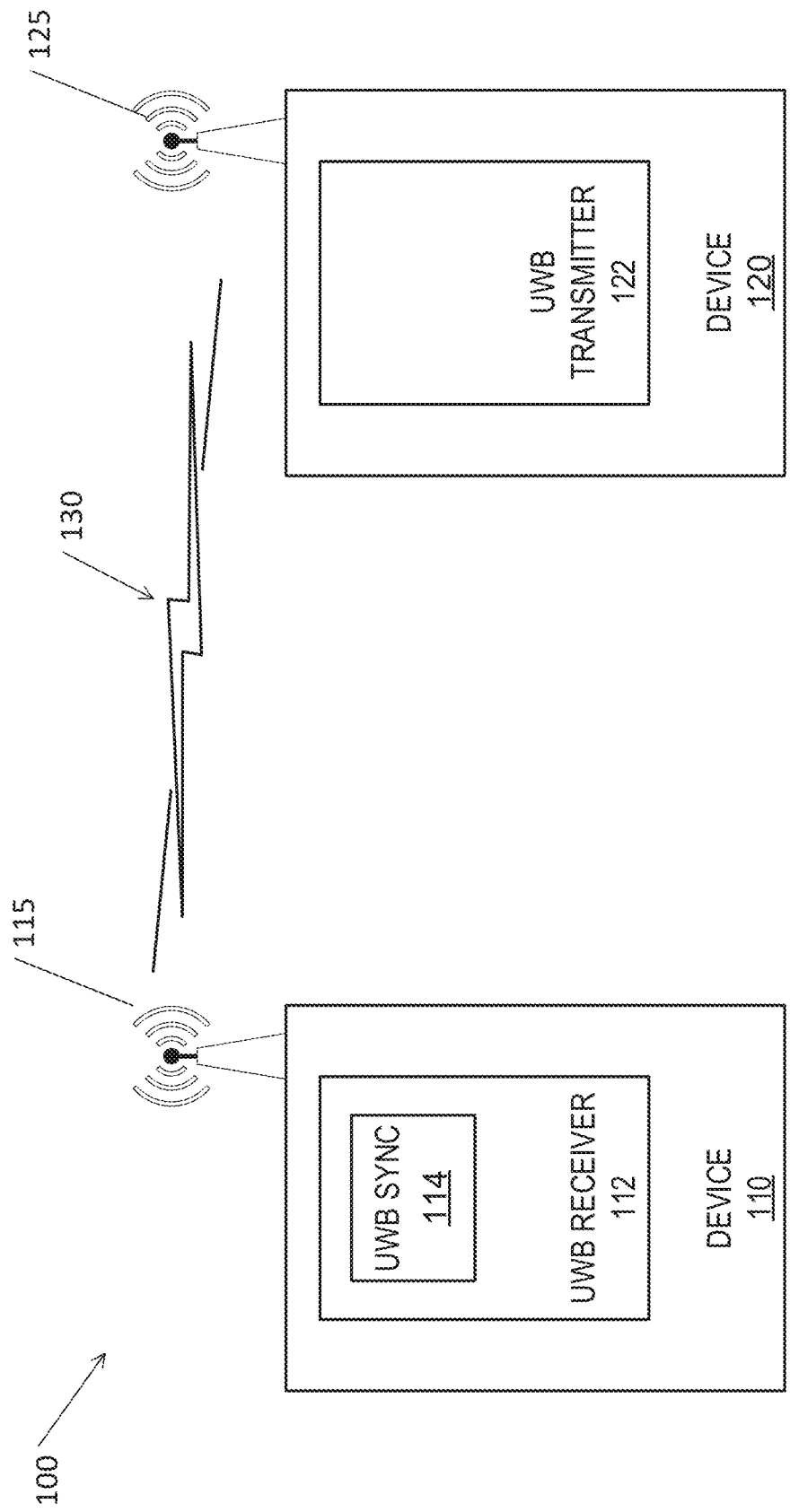
FIG. 1 is a schematic illustration of an exemplary IR-UWB communications system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing." "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices, or VLSI logic circuits.

Embodiments of the invention may provide a system and method for synchronizing to a received signal in an impulse radio ultra-wide band (IR-UWB) receiver, where the input signal is sampled at a frequency that is less than a Nyquist frequency of the received signal. In some embodiments, the sampling frequency may be as low as one eighth of the Nyquist frequency, while still providing high detection rates of the synchronization symbol. Embodiments of the present invention may be suitable for initial synchronization, where both the carrier frequency and frame timing of the received signal may be unknown. Embodiments of the invention may include calculating a cross-correlation between a synchronization symbol and a part of the sampled received signal that is equal in length to the synchronization symbol, calculating one or more autocorrelations, where each autocorrelation is performed between the results of the cross-correlation and the results of the cross-correlation delayed by a time lag that equals one or more time-durations of the synchronization symbol, repeating calculating the at least one autocorrelation and accumulating the results of each of the at least one autocorrelation to obtain at least one coarse synchronization window and analyzing the at least one coarse synchronization window to detect presence of the synchronization symbol in the received signal. According to embodiments of the invention, synchronization to the input signal at the UWB receiver may be performed based on the detected synchronization symbol in the received signal.

Embodiments of the invention may improve the technology of UWB receivers, by improving the synchronization module within the UWB receiver. Due to the low frequency of operation and efficiency of detection, embodiments of the invention have reduced complexity, lower silicon area and lower power consumption in the UWB synchronization stage, comparing to known in the art synchronization modules, while maintaining high performance. It has been shown experimentally that a synchronization module implemented according to embodiments of the invention was able to detect correctly the UWB preamble and specifically, the synchronization symbol within the UWB preamble, even below noise floor, typically at signal to noise (SNR) that is lower than −12 dB. Embodiments of the invention was further proven experimentally to be robust to multi-path channels, high frequency offset of up to +/−40 ppm, and radio frequency (RF) impairments.

Embodiments of the invention may utilize the special structure of the UWB preamble synchronization symbol, also referred to as a SYNC sequence, that may enable reliable detection even when sampled below the Nyquist sampling rate. The chip rate, e.g., the number of pulse intervals (chips) per second, for an IR-UWB signal is close to 499.2 Mega Hertz (MHz). e.g., two times the frequency of the received signal. Embodiments of the invention, however, successfully operate at only 124.8 MHz, e.g., one fourth of the chip rate.

Embodiments of the invention may further provide, as a product of the detection of the synchronization symbol in the UWB preamble, a coarse measurement of the carrier frequency offset (CFO) and of the timing misalignment, also referred to as timing drift. An offset of the local reference clock of the UWB receiver may be estimated based on the coarse CFO. Synchronization to the received signal may include compensating for the estimated CFO and timing misalignment.

Embodiments of the invention may attempt to synchronize to the UWB preamble synchronization symbol. Once successful, synchronization data. e.g., CFO and timing misalignment data may be provided to other modules in the UWB receiver, and specifically to the packet processing module that may start operating immediately upon detection of the received packet in the input signal. In this stage, the UWB modem may process the input samples at a sampling rate of 998.4 MHz.

Synchronization may include aligning with the frequency of a received signal, e.g., tuning the frequency of the UWB receiver to the frequency of a received signal, and aligning with the structure of the UWB packet. Aligning with the frequency of the received signal may include estimating the CFO or the frequency of the received signal. Aligning with the timing of the UWB packet may include finding a known timing point in the UWB packet. A synchronization signal may be included at a known location within a preamble of the received UWB packet. Therefore, aligning the UWB packet may include finding the synchronization signal. The time and frequency synchronization procedure typically includes a coarse synchronization stage and a fine synchronization stage. The coarse synchronization stage is performed using the received UWB signal, typically after the received signal is decimated (e.g., downsampled). Throughout the present application, the terms received signal and received IR-UWB signal may refer to the same signal and may be used interchangeably. When the coarse synchronization stage is performed, the receiver has no initial knowledge of the timing and frequency offset of the received signal. The fine synchronization stage, may be performed after the coarse synchronization stage, typically using the received signal at a high sampling rate (e.g., the received signal, prior to decimation). At the fine synchronization stage the time and frequency estimations from the coarse synchronization stage may be used as an initial estimate of the timing and frequency of the received signal.

Embodiments of the present invention will be given with reference to IR-UWB, e.g., as defined in IEEE 802.15.4, high-rate pulse repetition frequency (HRP) UWB standard. However, it will be apparent to these skilled in the art that embodiments of the present invention are not limited in this regard. Embodiments of the present invention may apply to other communication standards, or other releases of the IR-UWB standards, such as, but not limited to IEEE 802.15.4, IEEE 802.15.4z and IEEE 802.15.4ab.

Reference is now made to FIG. 1 which is a schematic illustration of an exemplary IR-UWB communication system 100, according to embodiments of the invention. IR-UWB system 100 may include a plurality of devices with an IR-UWB module. In the example of FIG. 1 two devices are presented, device 110 and device 120, however, more devices with IR-UWB module may take part in IR-UWB communication system 100. Devices 110 and 120 may refer to any device used to communicate using the IR-UWB communication standard. Devices 110 and 120 may be or may include, for example, computing devices having IR-UWB module communication capabilities, e.g., a hand-held telephone or smartphone, a laptop computer equipped with an IR-UWB module, an Internet of things (IoT) device or a machine type communication (MTC) device, e.g., environment or industrial remote sensors, domestic sensors, wearables, etc. As is apparent to one of ordinary skill in the art, devices 110 and 120 are not drawn to scale and are illustrative only.

Device 110 may include a receiver 112 and an antenna 115 for receiving IR-UWB signals, e.g., signals 130. And device 120 may include a transmitter 122 and an antenna 125 for transmitting IR-UWB signals, e.g., signals 130. Device 110 may be dormant for long time periods. Upon activation, device 110 may need to synchronize with the signal 130 received from device 120. Device 120 may transmit synchronization signals for this purpose. According to some communication standards, e.g., IR-UWB as defined in IEEE 802.15.4z and other standards, the synchronization signals may include a series of a repeating synchronization symbol. The repeating synchronization symbol may be known to device 110. Thus, device 110 may synchronize with the transmission of device 120 based on the expected synchronization symbols.

In many applications device 110 may have a significant frequency offset relatively to the frequency of device 120, e.g., the difference between the frequency of device 120 and the initial frequency of device 110 may be large. The large frequency offset may be a result of using cheap, low quality, oscillators at devices 110 and 120, in order to reduce the cost of devices 110 and 120, or from other reasons. In some embodiments, the frequency offset of device 110 with relation to device 120 may be up to ±40 parts per million (ppm). Thus, the initial synchronization may have to be performed under this range of frequency offset. However, embodiments of the present invention may support other ranges of frequency offset.

Receiver 112 may include a synchronization module 114 that may synchronize receiver 112 to an IR-UWB signal 130 received from device 120. According to embodiments of the invention, synchronization module 114 may operate on a signal sampled at a frequency that is less than or lower from the Nyquist frequency of received signal 130, e.g., down to at least one eighth of received signal 130. For example, the chip rate for an IR-UWB signal is 499.2 MHz. Synchronization module 114, however, may successfully operate on a signal sampled at only 124.8 MHz, e.g., one fourth of the chip rate.

According to embodiments of the invention, synchronization module 114 may sample received signal 130 in a frequency that is less than a Nyquist frequency of received signal 130, and for each part of the sampled received signal that is equal in length (e.g., in duration or in the number of samples) to the synchronization symbol, synchronization module 114 may calculate a cross-correlation between the known synchronization symbol and the part of the sampled received signal that is equal in length to the synchronization symbol, calculate at least one autocorrelation, where each autocorrelation is performed between the results of the cross-correlation and the results of the cross-correlation delayed by a time lag that equals one or more time-durations of the synchronization symbol, accumulate the results of each of the at least one autocorrelation to obtain at least one coarse synchronization window, analyze the at least one coarse synchronization window to detect presence of the synchronization symbol in the received signal 130. According to some embodiments, synchronization module 114 may, for every predetermined number of accumulations, filter the accumulated results using an infinite impulse response (IIR) filter to obtain a filtered coarse synchronization window, reset the accumulation, and analyze the filtered coarse synchronization window to detect presence of the synchronization symbol in the received signal 130. For example, synchronization module 114 may analyze the at least one coarse synchronization window or the filtered coarse synchronization window by finding a peak in the at least one coarse synchronization window or filtered coarse synchronization window and determining that the synchronization symbol is present if a peak is detected.

Upon detection of the synchronization symbol in the sampled received signal, synchronization module 114 may synchronize to input signal 130 based on the detected synchronization symbol in the received signal. For example, synchronizing to input signal 130 may include calculating a CFO between received signal 130 and a local clock based on a phase of the at least one coarse synchronization window, calculating a timing misalignment between the at least one coarse synchronization window and a location of the synchronization symbol, and compensating for the CFO and the timing misalignment.

Figure 2:
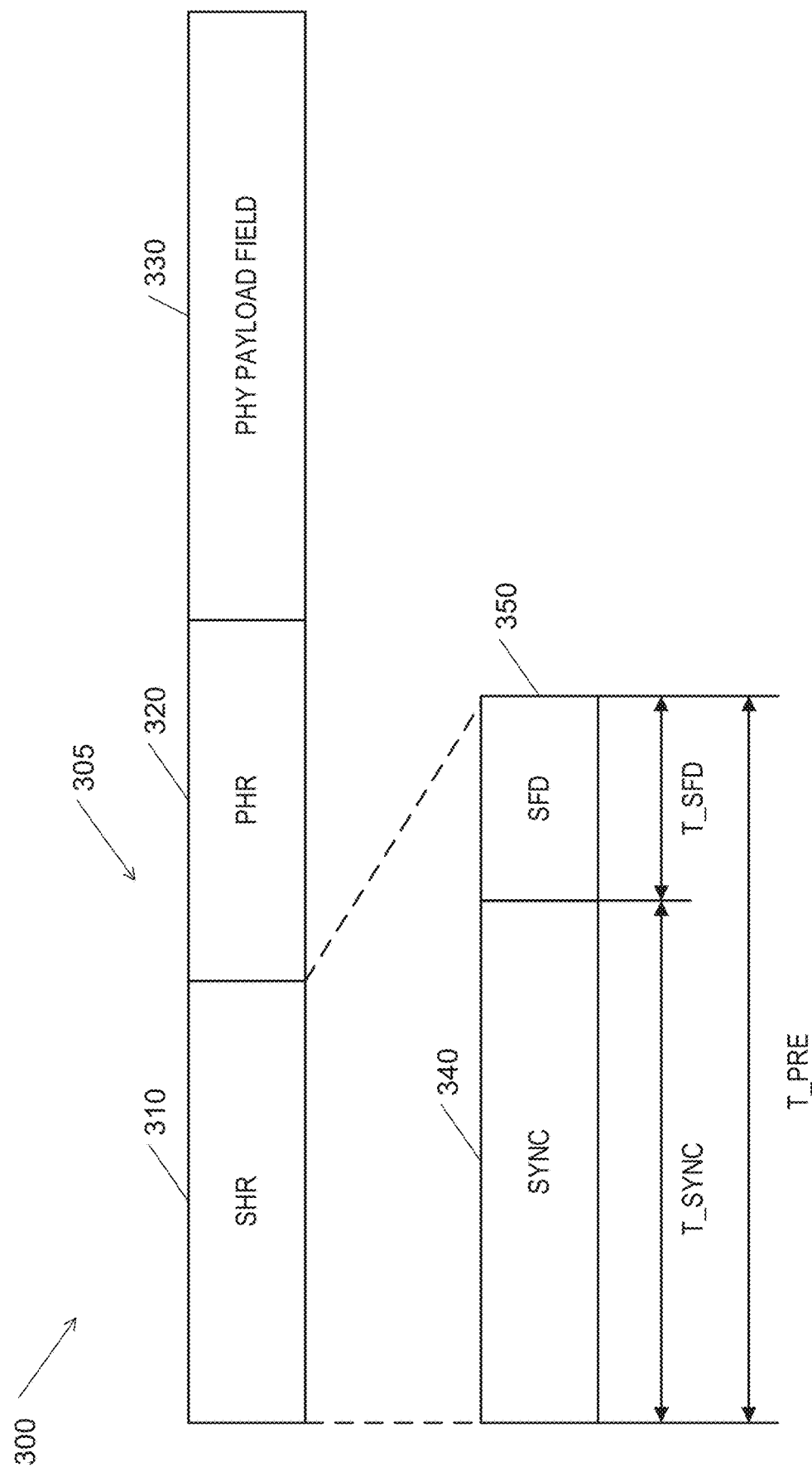
FIG. 2 depicts an exemplary structure of a UWB packet of an IR-UWB transmission, helpful in demonstrating embodiments of the invention.

Reference is now made to FIG. 2, which depicts an exemplary structure of a UWB packet 300 of an IR-UWB transmission, helpful in demonstrating embodiments of the invention. FIG. 2. presents an exemplary structure of a UWB packet according to the IEEE 802.15.4, HRP UWB standard. It is noted, however, that this structure is presented as an example only. Embodiments of the invention are not limited to this particular UWB packet structure and may be generalized to any IR-UWB implementation. As can be seen in FIG. 2, UWB packet 300 starts with a preamble 305 including a synchronization header (SHR) 310 in a duration of $T_{pre}$, followed by a physical layer (PHY) header (PHR) 320 and a PHY payload field 330. The PHY payload field 330 includes a synchronization (SYNC) field 340 in a duration of $T_{SYNC}$, followed by a SYNC field delimiter (SFD) 350 in a duration of $T_{SFD}$.

Figure 3:
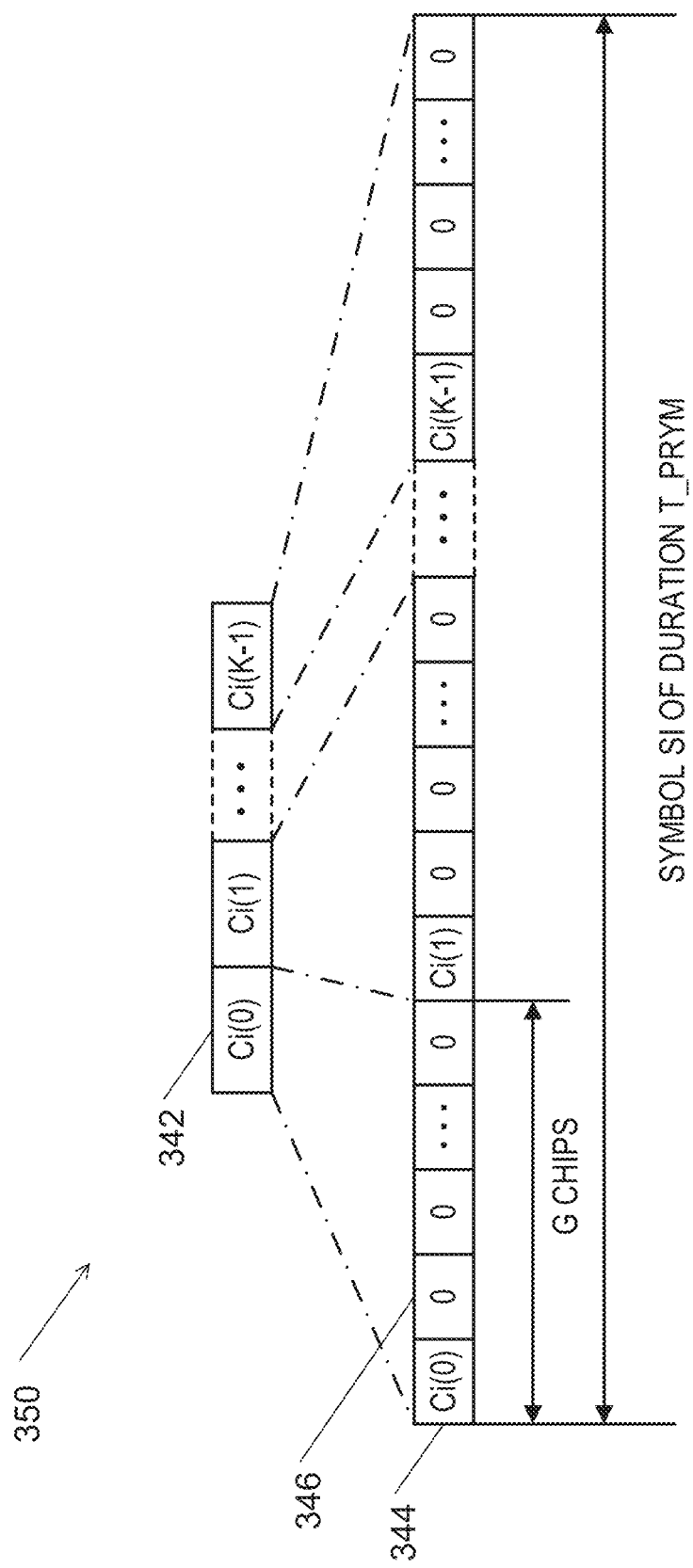
FIG. 3 depicts an exemplary structure of synchronization symbol of a UWB packet, helpful in demonstrating embodiments of the invention.

Reference is now made to FIG. 3, which depicts an exemplary structure of synchronization symbol 350 of a UWB packet 300, helpful in demonstrating embodiments of the invention. FIG. 3. presents an exemplary structure of a synchronization symbol according to the IEEE 802.15.4. HRP UWB standard. It is noted, however, that this structure is presented as an example only. Embodiments of the invention are not limited to this particular structure of a synchronization symbol and may be generalized to any IR-UWB implementation. As can be seen in FIG. 3, synchronization symbol 350 may include a repetition of a sequence of multiple ternary pulses 344. Each synchronization symbol 350 may include a sequence of, for example, 31, 91 or 127 ternary pulses 344 (the number ternary pulses 344 is denoted as K), with a gap of G chips (where each chip has a duration of ??? nanoseconds (usec)) between ternary pulses 344. A ternary pulse 344 may be assigned one of the 3 values: $\{0, 1, -1\}$ such that the "+1" and "−1" values represent a binary phase-shift keying (BPSK) modulation of ternary pulse 344 and the "0" value represents omitted pulse 346 (no pulse). Ternary pulses 344 are denoted as $Ci(0) \ldots Ci(K-1) \in \{0, 1, -1\}$, where i denotes a code index, and may be chosen among several sequences defined by the IEEE 802.15.4z standard. In a typical operation mode, the values of G. K and the ternary sequence $Ci(0) \ldots Ci(K-1)$ of ternary pulses 344 may be known to receiver 112. The known ternary sequence $Ci(0) \ldots Ci(K-1)$ may be referred to herein as the known synchronization symbol, or simply as the synchronization symbol 350. However, the exact number of repetitions of synchronization symbol 350 within SYNC field 340 may not be known to receiver 112. UWB receiver 112 may identify the end of SYNC field 340 by detecting SFD field 350 of preamble 305. It is noted that SFD detection is out of the scope of this paper.

Synchronization module 114 may detect the presence of a received UWB packet 300 in input or received signal 130 by identifying synchronization symbol 350 of the SYNC field 340 in the preamble 305 of UWB packet 300. Reliable UWB synchronization by detection of SYNC field 340 may pose the following challenges (different embodiments need not meet all challenges).

- In some use-cases UWB receiver 112 does not have any information about the expected time upon which UWB packet 300 shall arrive. Such use-cases require long continues operation in acquisition mode which may drain the battery of device 110. For this reason, power-efficient synchronization method may be required for UWB device 100, especially for low-cost devices such as many IoT devices, which may be powered from a coin-size battery.
- The length of SYNC field 340, or the number of repetitions of synchronization symbols 350, may not be known at receiver 112. According to the IEEE 802.15.4z definition, the number of synchronization symbols 350 repetitions may vary in range from 16 to 4096 repetitions. The synchronization algorithm implemented by synchronization module 114 shall be robust enough to operate equally good from at least the longest to the shortest synchronization symbols 350, or at wider ranges.
- The synchronization algorithm shall be robust to high frequency offset between transmitter 122 to the receiver 112. The maximal frequency offset may be +/−40 ppm by IEEE 802.15.4z or higher.

Receiver 112 shall reliably detect packet 300 under various channel conditions. Due to the very high bandwidth of IR-UWB, UWB multi-path channels may contain dozens of multi-path taps.

High sensitivity requirement demands reliable detection of packet 300 even in cases where the received signal strength is lower than the noise level.

Detection of packet 300 shall be fast. This requirement is especially important for the extreme case of a short SYNC field 340.

Figure 4:
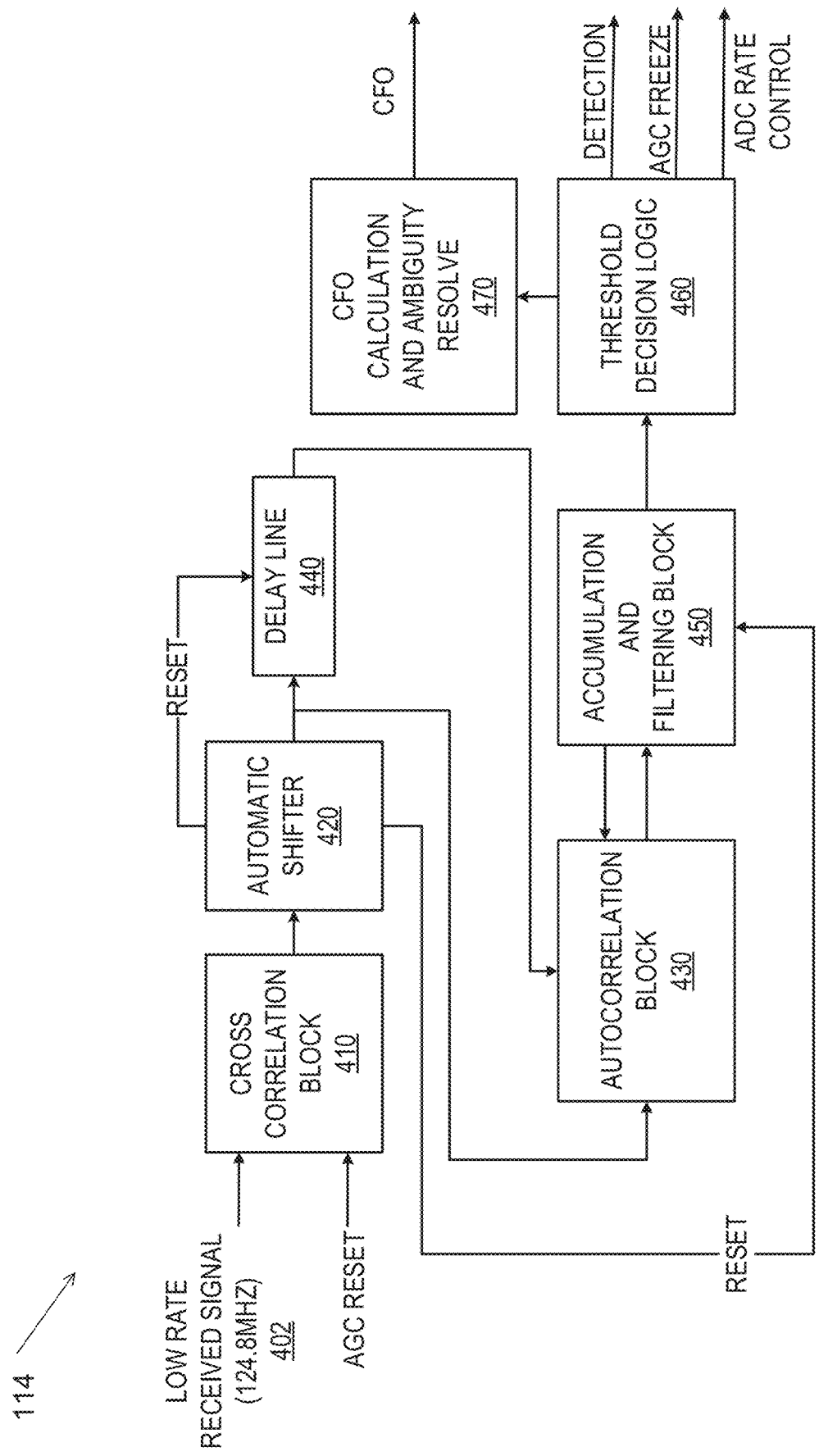
FIG. 4 is a schematic illustration of synchronization module, according to embodiments of the invention.

Reference is now made to FIG. 4, which is a schematic illustration of synchronization module 114, according to embodiments of the invention. Synchronization module 114 may be implemented as a logic circuit in a hardware description language (HDL) design, written in Very High Speed Integrated Circuit (VHSIC) hardware description language (VHDL), Verilog HDL, or any other hardware description language, in a chip, an integrated circuit (IC), digital integrated circuits, a processor or dedicated hardware logic (VLSI).

Synchronization module 114 may sample received signal 130 in a frequency that is lower or less than a Nyquist frequency of received signal 130 or obtain sampled low rate received signal 402. For example, the chip rate for received signal 130 may be 499.2. MHz. Synchronization module 114 may sample received signal 130 at a frequency of only 374.4 MHz, 249.6 MHZ, 124.8 MHz etc., e.g., as low as one fourth of the chip rate. Other frequencies that are lower or less than the Nyquist frequency of received signal 130 may be used. Sampled low rate received signal 402 may include a plurality of complex samples, including 8 bits real part and 8 bits imaginary part. Other formats may be used. Unless specifically noted otherwise, all operations performed on low rate received signal 402 are performed in complex format.

According to embodiments of the invention, cross-correlation block 410 may calculate a cross-correlation between synchronization symbol 350 (e.g., ternary sequence Ci(0) . . . Ci(K−1)) and a part or section of sampled received signal 402 that is equal in length (e.g., equal in duration or in the number of samples) to synchronization symbol 350. According to embodiments of the invention, cross-correlation block 410 may calculate the cross-correlation repeatedly for each part of the sampled received signal that is equal in length to the synchronization symbol.

Due to the nature of sampled received signal 402 and the synchronization symbol 350, the output of the cross-correlation may be a combination of coherent additions and subtractions of pulse samples in sampled received signal 402. Zeros in synchronization symbol 350 may account for code spreading. For example, on code length of K=31, considering operation at one fourth of the standard base rate (499.2 Mhz), three zeros (or omitted pulses 346) may imply no operation on corresponding sample of sampled received signal 402. The result (e.g., output signal) of cross-correlation block 410 may be described as:

$$x(n) = \sum_{k=1}^{codeLength} Ci(k)r(n + k * C) \quad \text{(Equation 1)}$$

Where n is an index in a cross-correlation result window, that is equal in length (e.g., number of samples in synchronization symbol 350, n=1 . . . number of samples in synchronization symbol 350, x(n) is the cross-correlation result for index n, k is a ternary sequence index. Ci(k) is a value of ternary pulses of synchronization symbol 350 at index k, r is the sampled received signal 402, and C is samples per delta interval in r(n). Thus, the result of the cross-correlation is a window of n values where =1 . . . number of samples in synchronization symbol 350. In some embodiments, the values in the output of cross-correlation block 410, e.g., the results of the cross-correlation, may in a number format of 15-bit complex, including 15 bits real part and 15 bits imaginary part. This is due to full precision of 8-bit input and maximal code gain of 81 results in 14.5 bits. Other formats may be used.

According to embodiments of the invention, automatic shifter block 420 may reduce or scale the number of bits of the results of the cross-correlation, e.g., from 15-bit complex to, for example 12-bit complex, including 12 bits real part and 12 bits imaginary part. Automatic shifter block 420 may truncate 15-bits complex to 12-bits complex with rounding and saturation. Automatic shifter block 420 may a three-bit shifter that may shift the 15-bit complex left or right, [3 (<<), −3 (>>)], to optimally fit the 12-bit complex format. For example, when values in the results of the cross-correlation are low, e.g., occupy only 12-bits complex out of the 15-bits complex, the most significant bits (MSBs) of the 15-bits complex results of the cross-correlation are removed to fit the 15-bit complex into 12-bit complex results. When values in the results of the cross-correlation increase over 12-bit complex, the results are shifted right, by up to three bits, as required to fit the 12-bit complex format. Whenever the shift values are changed, the former results of cross correlation block 410 calculated in current window and values stored values in accumulation and filtering block 450 are reset (e.g., set to zero). Automatic shifter block 420 is optional and used to further optimize synchronization module 114, e.g., to reduce required memory and complexity. Embodiments of the invention may perform well without automatic shifter block 420.

Autocorrelation block 430 may, for each part of the sampled received signal that is equal in length to the synchronization symbol, calculate at least one autocorrelation, where each autocorrelation may be performed between the results of the cross-correlation (e.g., the results of cross-correlation block 410) and the results of the cross-correlation delayed by a time lag that equals one or more time-durations of synchronization symbol 350. The results of the cross-correlation may be delayed by a time lag by delay line 440. The result of the autocorrelation may be a window of n values where n=1 . . . number of samples in synchronization symbol 350.

According to some embodiments, a first time lag may equal one time-durations of synchronization symbol 350, and a second time lag may equal two time-durations of synchronization symbol 350. In this example, autocorrelation block 430 may calculate a first autocorrelation between the results of the cross-correlation and the results of the cross-correlation delayed by a time lag that equals the time-duration of the synchronization symbol 350 to obtain a first autocorrelation window, and a second autocorrelation between the results of the cross-correlation and the results of the cross-correlation delayed by a time lag that equals two time-duration of the synchronization symbol 350 to obtain a second autocorrelation window. Other time lags may be used.

Accumulation and filtering block 450 may, for each part of the sampled received signal that is equal in length to the synchronization symbol (e.g., refereed to herein as an input symbol), accumulate the results of each of the at least one autocorrelation to obtain at least one coarse synchronization window. The accumulation may be performed for each index of the autocorrelation window, so that autocorrelation results at index 0 are accumulated, autocorrelation results at index 1 are accumulated, and so on. Thus, the coarse synchronization window may also be a window of n values where n=1 ... number of samples in synchronization symbol 350.

For example, if a first time lag that equals one time-durations of synchronization symbol 350, and a second time lag that equals two time-durations of synchronization symbol 350 are used, accumulation and filtering block 450 may accumulate the results of first autocorrelation to obtain a first coarse synchronization window, and the results of the second autocorrelation to obtain a second coarse synchronization window. Each of the coarse synchronization windows may be equal in length, e.g., include equal sample number, or represent equal time duration, as the known synchronization symbol 350.

The autocorrelation and accumulation may be performed by, for example:

$$a(v)_L = \sum_{i=0}^{N} x((i-L) * T_{psym} + v)^* x(i * T_{psym} + v) \quad \text{(Equation 2)}$$

Where $T_{psym}$ is the number of samples in an input symbol, $a(v)_L$ is the result of the autocorrelation and accumulation for lag index L, and offset index in $T_{psym}$ samples length of input symbol, x(n) is the cross-correlation result for index n. N is the number of autocorrelation results (synchronization symbol windows) that are accumulated, also referred to as the accumulation depth. The accumulation may be repeated for a predetermined number of input symbols, e.g., 8, 16, 24, 32 symbols etc. The accumulation may be reset to zero after the predetermined number of input symbols is accumulated and analyzed, and in other circumstances as disclosed herein, e.g., when automatic shifter block 420 reduces or scales the number of bits of the results of the cross-correlation.

Figure 5:
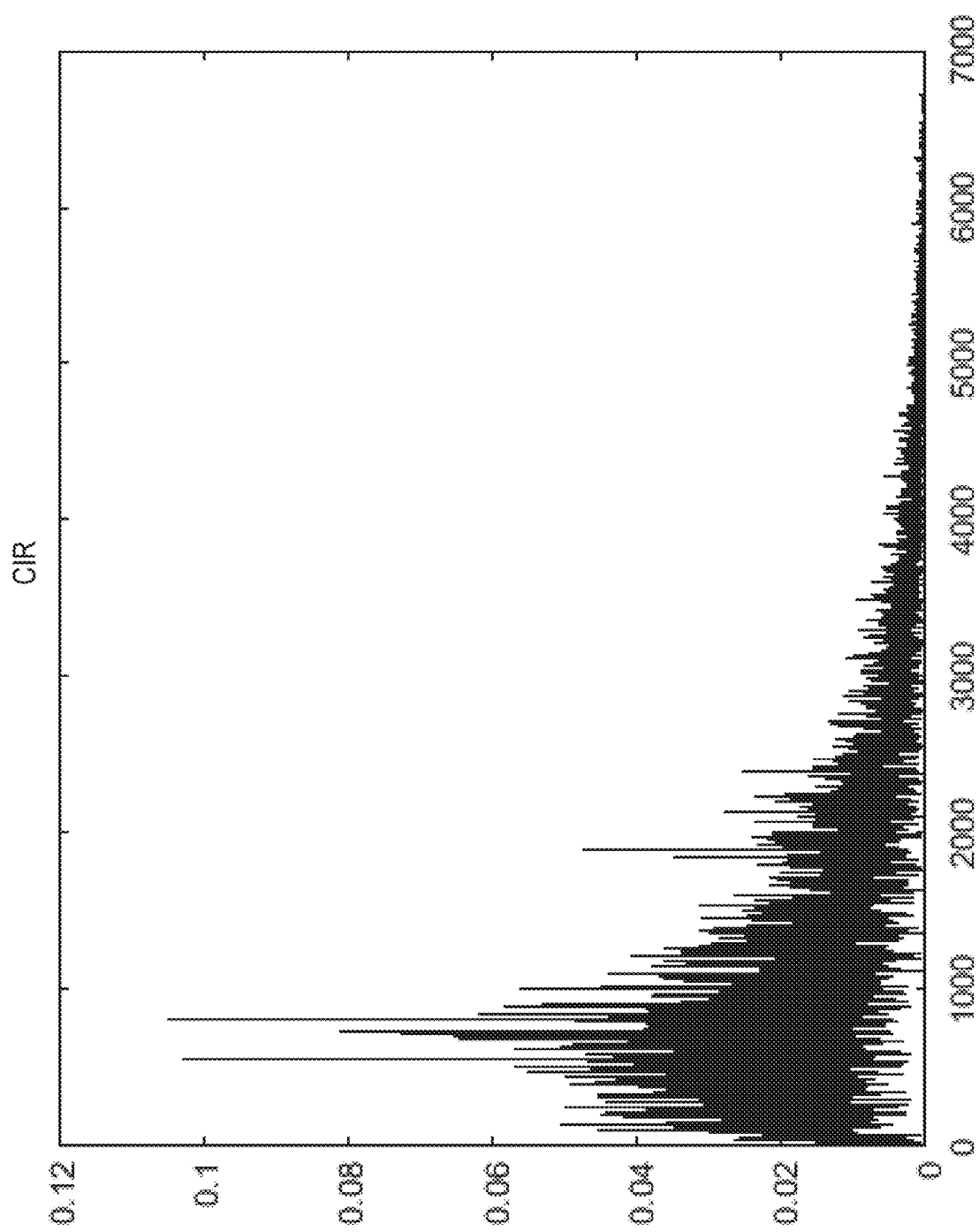
FIG. 5 depicts an example of channel impulse response of a received signal, helpful in demonstrating embodiments of the invention.
Figure 6:
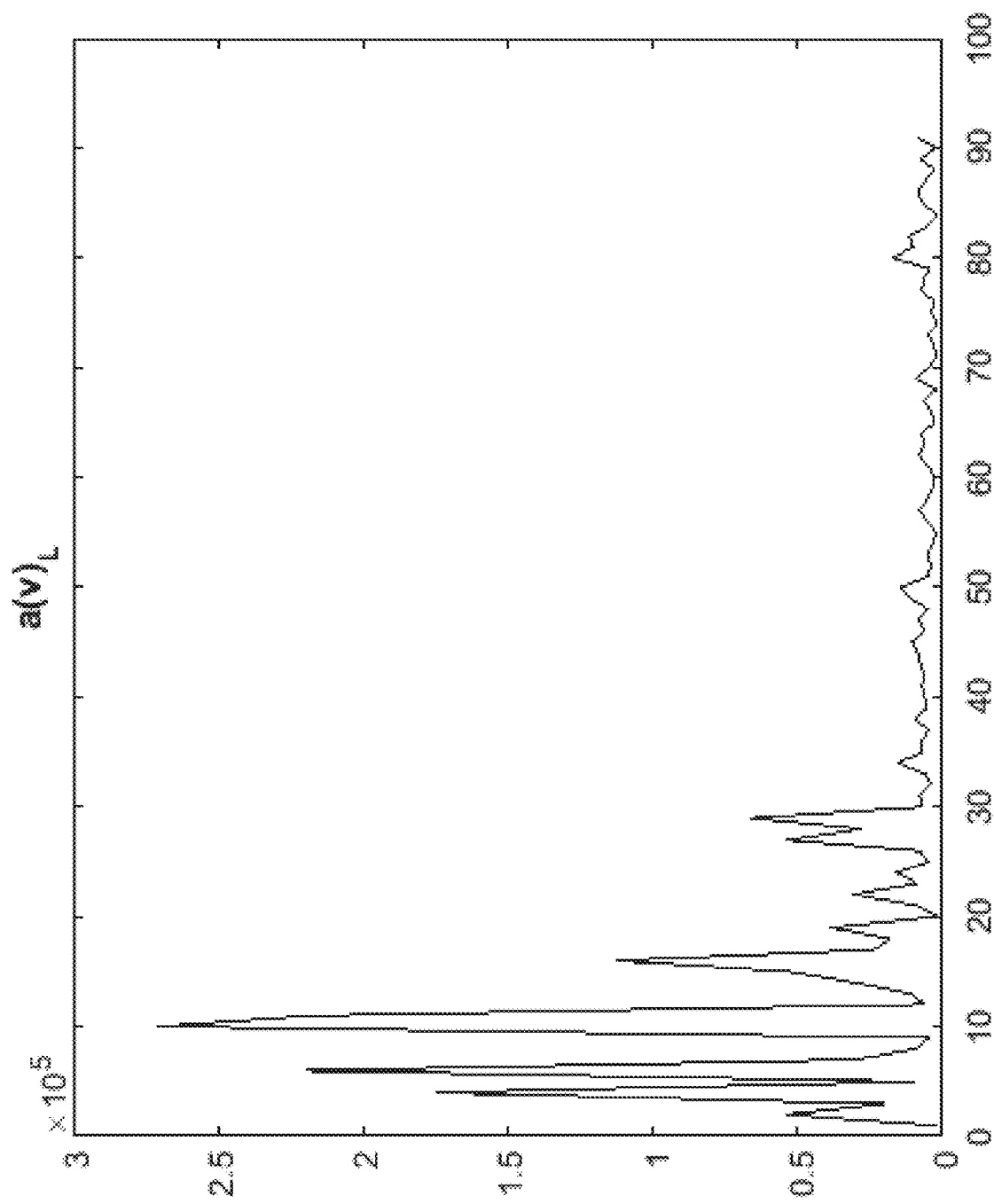
FIG. 6 depicts an example of elements of a coarse synchronization window of the received signal, according to embodiments of the invention.

According to embodiments of the invention, elements of a coarse synchronization window $a(v)_L$ typically have an amplitude that is similar to a channel impulse response (CIR) and a constant phase that is a function of the CFO. An example of CIR of a received signal 130 is depicted in FIG. 5, and $a(v)_L$ of the same received signal 130 is depicted in FIG. 6.

Accumulation and filtering block 450 may further, for every predetermined number of accumulations, (e.g., one or more) filter each of the one or more coarse synchronization windows using an infinite impulse response (IIR) filter, to obtain a corresponding filtered coarse synchronization window for each of the one or more coarse synchronization windows. After filtering accumulation and filtering block 450 may reset (e.g., set to zero) the one or more coarse synchronization windows. Filtering each of the one or more coarse synchronization windows may enable considering more than N symbols, if required, e.g., in conditions of low SNR, in which more than N symbol accumulation is required. The purpose of the IIR filter is to provide additional processing gain on top of the accumulation described above. An example of an IIR filter is provided below:

$$aIIR(v)_L = \overline{aIIR(v)_L}(1-\alpha) + a(v)_L \alpha \quad \text{(Equation 3)}$$

Where $\overline{aIIR(v)_L}$ is the previously calculated IIR output stored in a buffer. α is a configurable "forgetting" coefficient and, for example, $$\alpha = \frac{1}{2^q},$$

where q is an integer number that may equal 1, 2, 3, etc. Other IIR filters and coefficients may be used.

According to some embodiments of the invention, if a packet 300 including a SYNC field 340 is present in received signal 130, the coarse synchronization window is expected (if N is high enough, or after filtering) to contain strong or large elements. e.g., peaks, indicating of a synchronization symbol in sampled low rate received signal 402. The location of the peak in the coarse synchronization window (or in the filtered coarse synchronization window) may be indicative of occurrence offset synchronization symbol 350 relatively to the coarse synchronization window (as noted, the timing of the coarse synchronization window is arbitrary with relation to the timing of SYNC field 340). In addition, the coarse synchronization window may have a complex phase which is a function of the CFO. e.g., the CFO may be extracted from the complex phase of the coarse synchronization window.

According to some embodiments, threshold decision logic 460 may, for each part of the sampled received signal that is equal in length to the synchronization symbol (e.g., for each accumulation of a coarse synchronization window and/or filtered coarse synchronization window), analyze the at least one coarse synchronization window to detect presence of the synchronization symbol in the received signal. e.g., by finding a peak in the at least one coarse synchronization window and/or filtered coarse synchronization window, and determining that the synchronization symbol is present if a peak is detected. If a peak is not detected, threshold decision logic 460 may determine that the synchronization symbol not present, or not detectable yet.

According to some embodiments, finding a peak in a coarse synchronization window and/or filtered coarse synchronization window, may include, for each sample in the coarse synchronization window, summing values of the coarse synchronization window in a cyclic window of a first number of samples around the sample to obtain a first local sum, dividing an amplitude of the first local sum by an average amplitude of the first coarse synchronization window to obtain a first local sum to average value, and determine that a first peak exists for the sample if the first local sum to average value accedes a first threshold. This process may be repeated for each accumulation of the at least one coarse synchronization windows, and for the filtered coarse synchronization windows, as required. e.g., until a peak is found. This process may be further repeated for different lengths of the cyclic window, e.g., different number of samples. For example, the process may be repeated for a cyclic window of 3, 5, 7, etc. samples. The number of samples in a cyclic window is denoted as winSize. According to embodiments of the invention, short windows (e.g., of 2-4 samples) are more suitable for a "single peak". Additive white Gaussian noise (AWGN) channel or low delay spread multipath channels while a long window (e.g., of 5-9 samples) are more suitable for "multi peak", AWGN channel with high PPM offset accumulated over time or high delay spread multipath channels.

For example, summing values of the coarse synchronization window in a cyclic window may be performed by (other equations may be used):

$$\gamma(v)_L = \sum_{i=1}^{winSize} a((v+i)\% \, symLength)_L \qquad \text{(Equation 4)}$$

Where % represents a modulo operation due to the cyclic nature of the window. Finding the maximum index may be performed by (other equations may be used):

$$pInd = \max_v \, (abs(\gamma(v)_L)) \qquad \text{(Equation 5)}$$

Dividing an amplitude of the first local sum by an average amplitude of the first coarse synchronization window to obtain a first local sum to average value. e.g., calculate a local sum to average value, may be performed by (other equations may be used):

$$p2a = \frac{|\gamma(pInd)_L| * (symLength - winSize)}{\text{sum}(|(a(v)_L|) - \text{sum}(|(a(pInd + (1:winSize))_L|)} \qquad \text{(Equation 6)}$$

In equation 6, the average value does not include the window, however this may differ in other embodiments. Calculating the phase of peak may be performed by (other equations may be used):

$$pAng = \text{angle}(\gamma(pInd)_L) \qquad \text{(Equation 7)}$$

According to some embodiments, threshold decision logic 460 may compare the local sum to average values to a threshold and determine that a peak exists for the sample if the local sum to average value accedes the threshold. According to some embodiments, threshold decision logic 460 may use other or additional pass criteria to determine if a peak exists. e.g., to determine that a synchronization symbol is detected. The pass criteria may be evaluated for all the time lags and cyclic window lengths used. The pass criteria may include relations between results of the different accumulations, lags and window lengths.

According to some embodiments, pass criteria are used. In this example, the pass criteria are tested for each coarse synchronization window (obtained after each accumulation of an input symbol) and filtered coarse synchronization window (except for the Angle convergence pass criteria which is not tested for the filtered coarse synchronization window), for an accumulation lag of 1 and 2, and for one short cyclic window (e.g., 2, 3 or 4 samples) and for one long cyclic window (e.g., 5, 6, 7 or 8 samples). The pass criteria may be (other pass criteria may be used):

Angle convergence—the phase of the tested coarse synchronization window converge as the results of the autocorrelations are accumulated. The angles pAng(i) over several iterations (e.g., input symbols) of calculating the coarse synchronization window, where i counts the processed input symbols, are tested for convergence over time meaning that all angle values should be tested and for every k,j the following term should be true:

$$|pAng(k) - pAng(j)| < Th_{angConv} \text{ or}$$

$$|pAng(k) - pAng(j)| > 2\pi - Th_{angConv}$$

This pass criteria requires that the differences between phases calculated in different iterations is smaller than a threshold phase $Th_{angConv}$. It is noted that due to the cyclical nature of the phase measurements converge not only when there is small difference between them but also there is a large difference between them that is close to $2\pi$ (2*pi).

Peak pass—the local sum to average value accedes a threshold. In some embodiments, a single threshold is used for the different time lags. In some embodiments, a single threshold value is used for the different time lags and window sizes. In some embodiments, different threshold values are used for the different time lags and window sizes. The local sum to average pass criteria may be:

$$p2a > Th_{det}$$

This pass criteria requires that the local sum to average values be larger than a threshold. $Th_{det}$. according to some embodiments, the threshold is adjustable, as disclosed herein. In some embodiments, the peak pass criteria should be true for all time lags and window sizes. In some embodiments, the peak pass criteria should be true for only a part of the time lags and window sizes, depending on the application.

The phase match across lags—The phases or angles $pAng_{L1}(i)$ to $pAng_{L2}(i)$ are calculated for the different lags used. e.g., L1 and L2, where i counts the processed symbols, tested to match:

$$|pAng_{L1}(i) - pAng_{L2}(i)| < Th_{angMatch} \text{ or}$$

$$|pAng_{L1}(i) - pAng_{L2}(i)| > 2\pi - Th_{angMatch}$$

This pass criteria requires that the differences between phases calculated for different lags is smaller than a threshold phase $Th_{angMatch}$.

Peak match across lags—The peak index $pInd_{L1}(i)$ to $pInd_{L2}(i)$ calculated for the different lags used, e.g., L1 and L2, where i counts the processed symbols, are tested to match:

$$|pInd_{L1}(i) - pInd_{L2}(i)| \le Th_{peakMatch} \text{ or}$$

$$|pInd_{L1}(i) - pInd_{L2}(i)| \ge symLen - Th_{peakMatch}$$

This pass criteria requires that the location of the detected peak in the coarse synchronization window or filtered coarse synchronization window across lags L1 and L2 is smaller than a threshold. $Th_{peakMatch}$ or larger than the symbol length minus the threshold $Th_{peakMatch}$, to account for the cyclic nature of the coarse synchronization window or filtered coarse synchronization window.

According to embodiments of the invention, once a peak is detected, threshold decision logic 460 may determine that the synchronization symbol is present in input signal 130.

Figure 7:
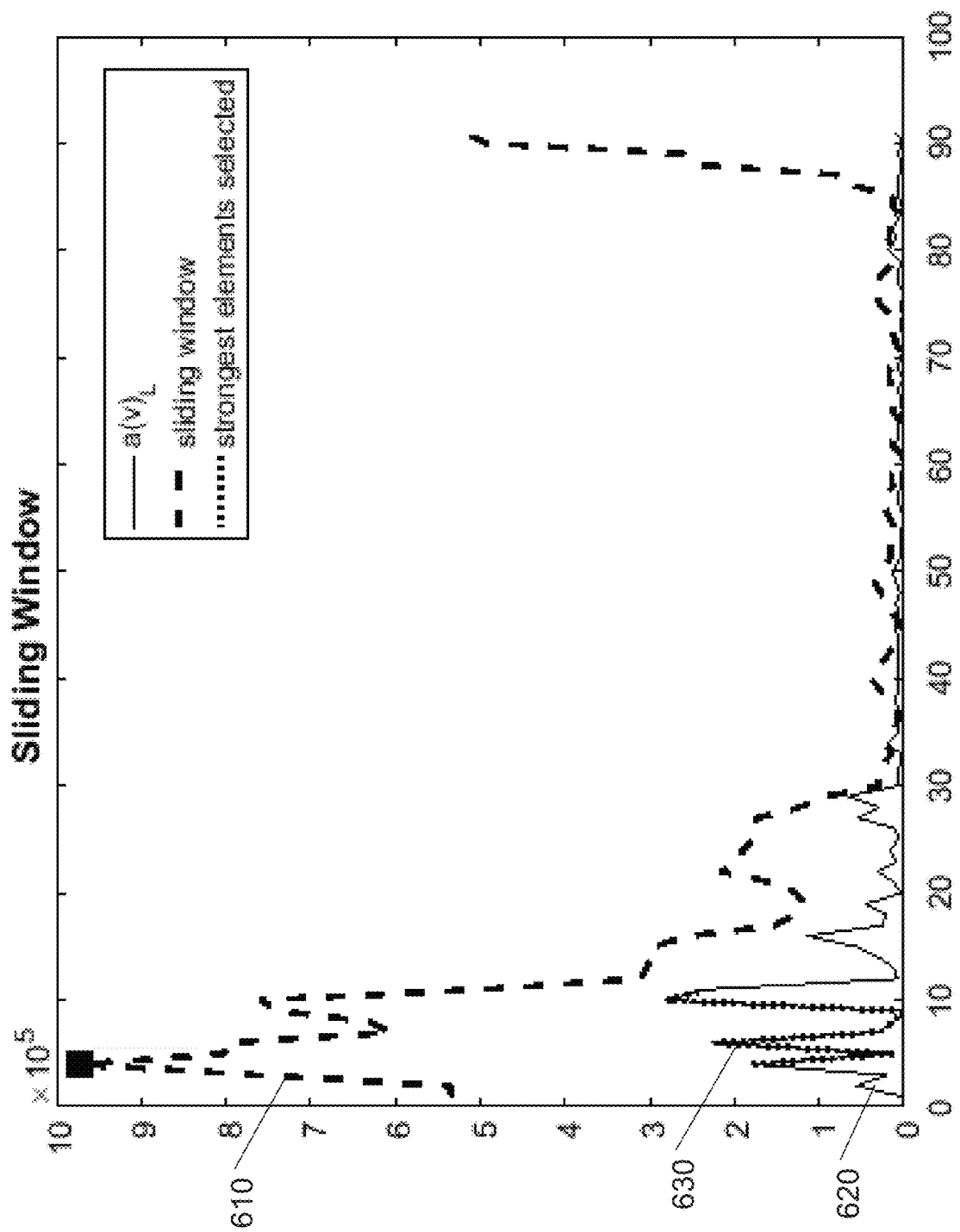
FIG. 7 depicts an example of a coarse synchronization window and a detected peak, according to embodiments of the invention.

Reference is now made to FIG. 7, which depicts an example of a coarse synchronization window and a detected peak, according to embodiments of the invention. In the example of FIG. 7, line 620 is the coarse synchronization window, line 610 is the local sum value with a window size of 8 samples, and segment 630 represents a detected peak elements.

Figure 8:
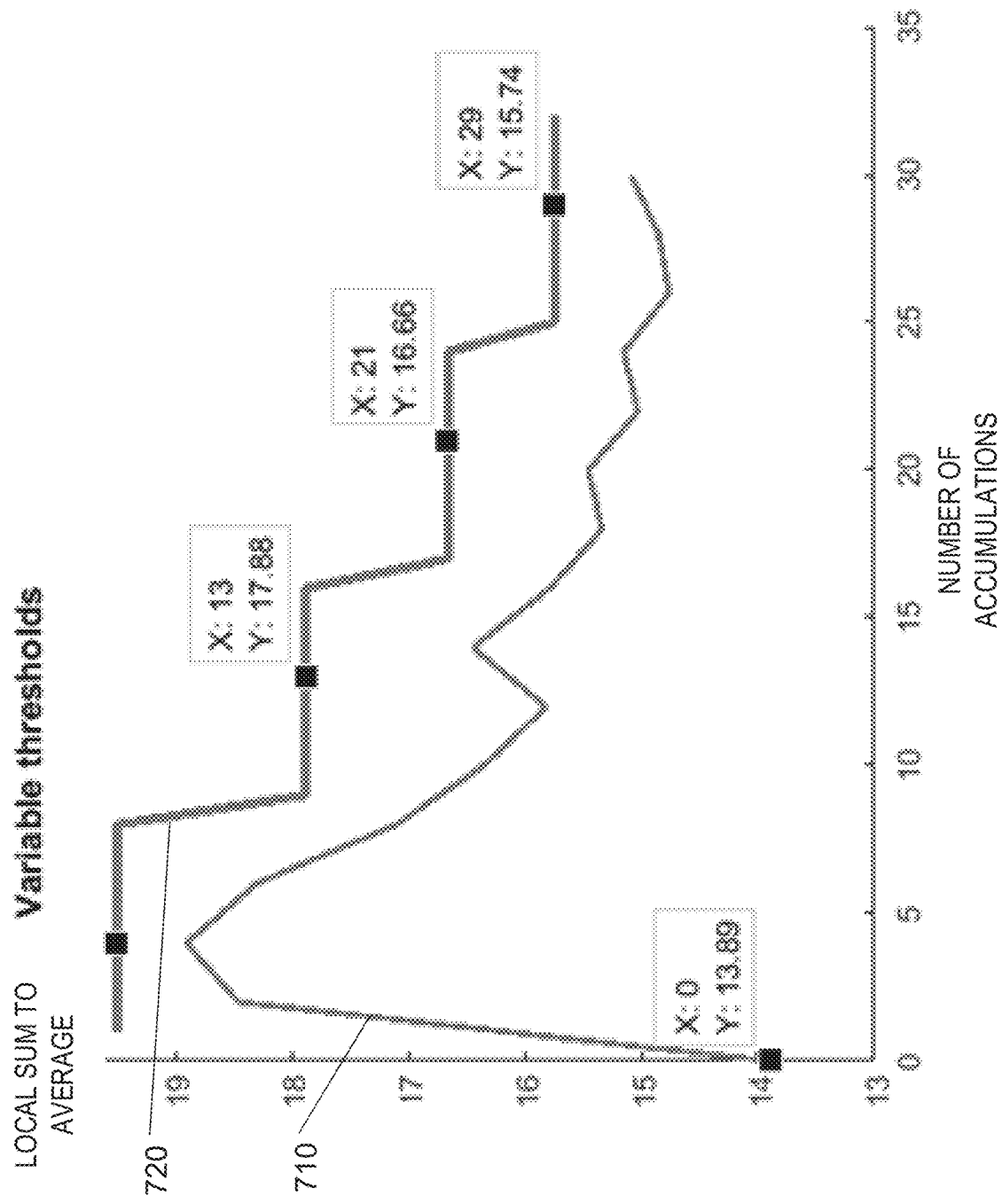
FIG. 8 depicts an example of a local sum to average value vs. a number of accumulations, obtained with random noise in a defined probability at the input of synchronization module, according to embodiments of the invention.

According to embodiments of the invention, local sum to average metric used in the peak pass criteria, was found to have variable characteristics as a function of the accumulation depth e.g., local sum to average value changes as N increases or as more autocorrelation results are summed. Operating when no signal is present, e.g., with random noise at the input of synchronization module 114, has been found to generate a local sum to average value that decreased as N increased. FIG. 8 depicts an example of a local sum to average value 710 vs. N, obtained with random noise in a defined probability at the input of synchronization module 114, according to embodiments of the invention. As can be seen in FIG. 8, the local sum to average value decreases as N increases (for N>5). Thus, using a constant threshold value for different N values, may falsely detect a peak at about N=5. To prevent false detection of peaks, the thresholds $Th_Q$et may be a function of N, e.g., and may decrease as N increase (for N>5).

According to some embodiments, CFO calculation and ambiguity resolve 470 may, once a peak is detected, synchronize to the input signal based on the detected synchronization symbol 350 in the received signal 130. According to some embodiments, synchronizing to the input signal may include calculating a CFO between the received signal 130 and a local clock based on a phase of the one or more coarse synchronization windows. For example, if two coarse synchronization windows are used. e.g., one with a lag of one input symbol and one with a lag of two input symbols, the CFO may be calculated based on both coarse synchronization windows of the two lags. Synchronizing to the input signal may further include calculating a timing misalignment between the at least one coarse synchronization window and a location of the synchronization symbol 350, and compensating for the CFO and the timing misalignment. The estimated start time of the synchronization symbol, as derived from the found peak elements may be used by following modules of receiver 112 to continue common receiver synchronization procedures. The FCO may be used to both correct the signal samples phase using multiplication and to perform resampling with interpolation to account for the timing drift.

According to some embodiments, using two lags, a lag of one input symbol, L1, and a lag of two input symbols, L2, the phase calculations made based on L2 may provide higher accuracy however, at the same time suffer from a certain level of ambiguity, whereas, calculating the phase based on L1 may not suffer from ambiguity, but may provide higher error in the phase calculations. The ambiguity in the phase calculations made based on L2 may be a result of the cyclic nature of phase which may cause the phase to wrap. According to some embodiments, the phase may be calculated based on L2, while the ambiguity may be resolved based on phase calculations made with L1.

The calculated phase may be modeled as the real or accurate phase and an error:

$$\bar{\varphi} = \text{angle}\left(\sum_k |A_k|^2 e^{i\varphi} + \tilde{n}\right) = \varphi + \text{error} \quad \text{(Equation 8)}$$

Where $\bar{\varphi}$ is the calculated phase $|A_k|^2$ is the amplitude of the accumulated complex values with the same phase $\varphi$ and $\tilde{n}$ is the noise.

In Equation 8, the error part or accuracy of the estimated phase is dependent on the noise $\tilde{n}$ or on the SNR. Estimating the final phase across different time lags means applying some factor C to the estimation of the phase, $\bar{\varphi}$:

$$\bar{\varphi}_{final} = \bar{\varphi} * C = (\varphi + \text{error}(SNR)) * C$$

Where for L=2, C=0.5, which effectively reduces the error to half the error of phase calculations with L=1. The gain from using larger time lag estimation, however, reduced the phase range that may be estimated:

Lag of 1 symbol—~1 μsec—range of ~[−500,500] KHz
Lag of 2 symbols—~2 μsec—range of ~[−250,250] KHz According to some embodiments, the phases $pAng_{L1}(i)$, $pAng_{L2}(i)$ of the complex peak elements of L1 and L2 (where i counts the processed symbols) may be used in combination by estimate the most accurate phase calculated based on L=2, e.g., from $pAng_{L2}(i)$ and solve possible ambiguity using the phase calculated based on $L=pAng_L(i)$.

For example, the phase may be determined, and ambiguity resolved, according to the following (other methods may be used):

$$a2 = \frac{pAng_{L2}(i)}{2}$$

$$a1 = pAng_{L1}(i)$$

$$d = |a1 - a2|$$

```
If (d > π)
    If (a2 > 0)
        a = a2 − π
    Else
        a = a2 + π
    end
Else
    a = a2
```

Thus, $pAng_{L2}(i)$ may be divided by two and compared with $pAng_{L1}(i)$. If the difference in absolute value is smaller than π (pi), then there is no ambiguity, and the phase may equal $pAng_{L2}(i)$ divided by two. Otherwise, ambiguity may be resolved by comparing $pAng_{L2}(i)$ divided by two to zero. If $pAng_{L2}(i)$ divided by two is larger than zero, then the phase may equal $pAng_{L2}(i)$ divided by two minus π. If $pAng_{L2}(i)$ divided by two is not larger than zero, then the phase may equal $pAng_{L2}(i)$ divided by two plus r.

Figure 9:
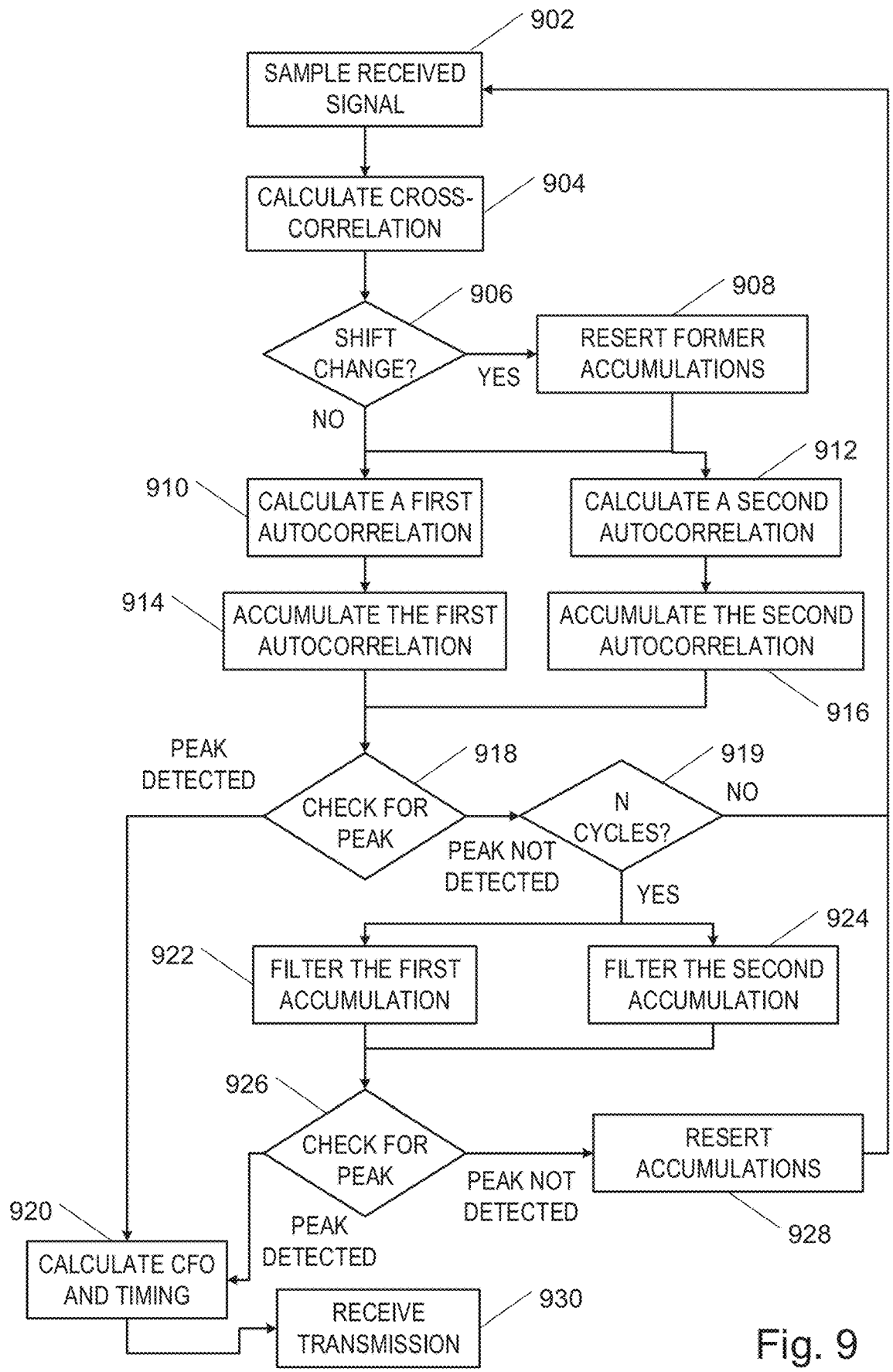
FIG. 9 is a flowchart diagram illustrating a method for synchronizing to a received signal in an IR-UWB receiver, according to embodiments of the invention.

Reference is now made to FIG. 9, which is a flowchart diagram illustrating a method for synchronizing to a received signal in an IR-UWB receiver, according to embodiments of the invention. Embodiments of the method for synchronizing to a received signal in an IR-UWB receiver may be performed by the systems in FIGS. 1 and 2, however, other hardware may be used. Embodiments of the method for synchronizing to a received signal in an IR-UWB receiver may be implemented in a hardware description language (HDL) design, written in Very High Speed Integrated Circuit (VHSIC) hardware description language (VHDL), Verilog HDL, or any other hardware description language. Embodiments of the method for synchronizing to a received signal in an IR-UWB receiver may be implemented in a chip, an integrated circuit (IC) or dedicated hardware logic (VLSI).

In operation 902, a received signal may be sampled to obtain a sampled received signal, e.g., by synchronization module 114, and specifically by cross-correlation block 410, or by another part of system 100. The received signal may be sampled in a frequency that is less than a Nyquist frequency of the received signal. For example, the chip frequency may be 499.2 MHz but the sampling frequency may be as low as 124.8 MHz. Other sampling frequencies may be used.

In operation 904, a cross-correlation between a synchronization symbol and the part of the sampled received signal that is equal in length to a known synchronization symbol may be calculated. The result of the cross-correlation may include a window in the length of the synchronization symbol (e.g., with the same number of samples as the synchronization symbol). The cross-correlation may be performed for example, by Equation 1. Operation 914 may be performed sequentially over time, thus the received signal may be arbitrarily divided to sections or parts that are sequential and equal in length to the synchronization symbol, and operation 914 may be performed for each of those parts or sections.

Figure 10:
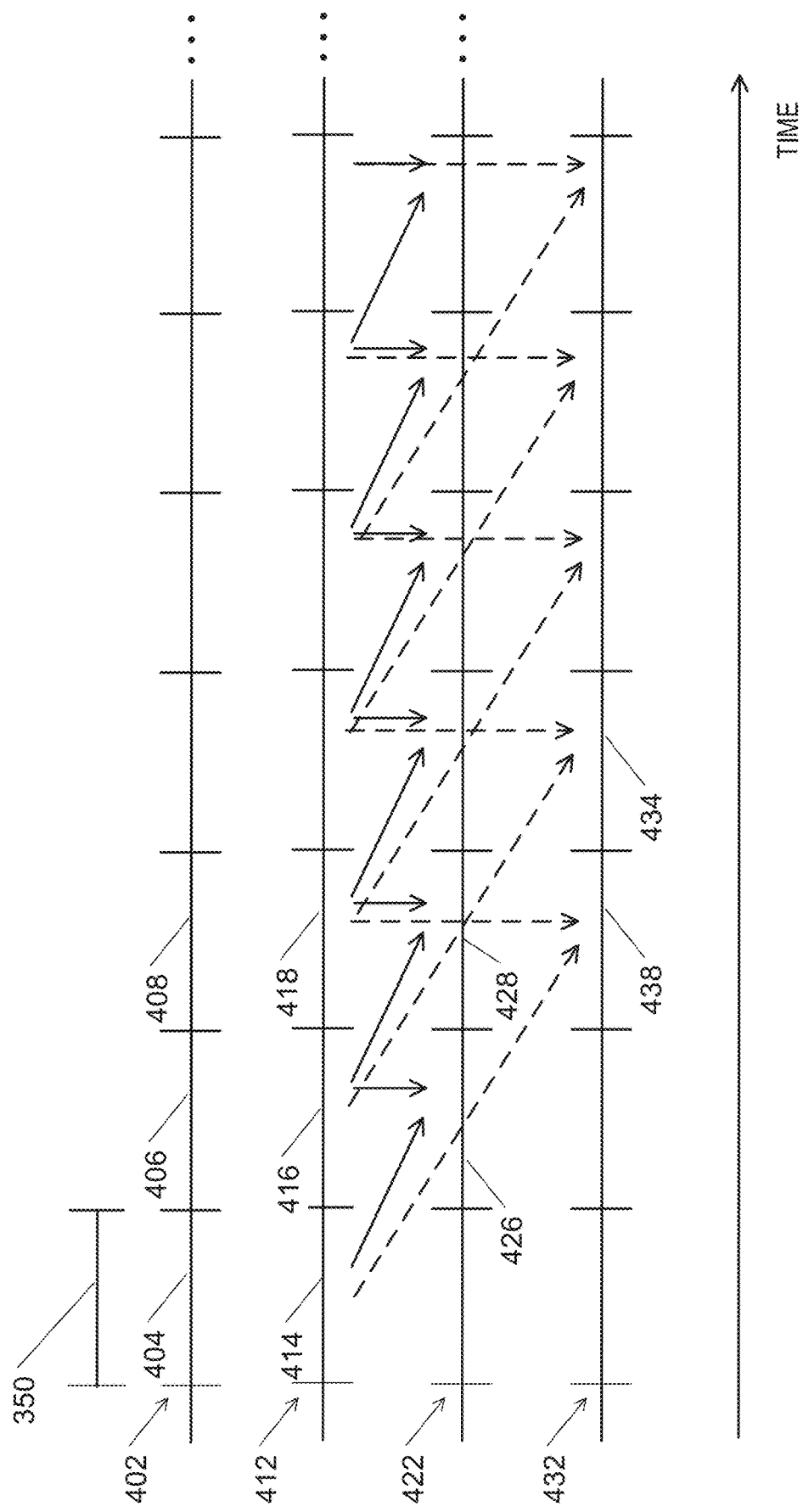
FIG. 10 depicts a schematic visual representation of a synchronization symbol, a sampled received signal the cross-correlation results, and the autocorrelation results over time, according to embodiments of the invention.

FIG. 10 depicts a schematic visual representation of synchronization symbol 350, sampled received signal 402 and the cross-correlation results 412 over time, according to embodiments of the invention. It is assumed that the leftmost part of FIG. 10 represents the beginning of an accumulation cycle or after accumulations are reset (at operation 928). As can be seen, sampled received signal 402 is divided into parts or sections 404, 406 and 408, each equals in length (e.g., time duration or number of samples) to synchronization symbol 350. Each time duration or number of samples of sampled received signal that equals the time duration or number of samples of synchronization symbol 350 may be referred to herein as a cycle. Cross-correlation results 412 are provided in parts 414, 416 and 418, each also equals in length to synchronization symbol 350, where part 414 of cross-correlation results 412 is a result of a cross-correlation between synchronization symbol 350 and part 404 of sampled received signal 402, part 416 of cross-correlation results 412 is a result of a cross-correlation between synchronization symbol 350 and part 406 of sampled received signal 402, etc.

According to some embodiments, the received signal may be in the format of 8-bit complex, and the results of the cross-correlation may be in the format of 15-bits complex. In operation 906, the number of bits in the results of the cross-correlation may be reduced, for example, to 12-bit complex, however other formats may be used. This operation is optional and may save storage area and further reduce complexity. The 15-bits complex numbers may be truncated to 12-bits complex numbers with rounding and saturation. When values in the results of the cross-correlation are low, e.g., occupy only 12-bits complex out of the 15-bits complex, the MSBs of the 15-bits complex results of the cross-correlation are removed to fit the 15-bit complex into 12-bit complex results. When values in the results of the cross-correlation increase over 12-bit complex, the results are shifted right, by up to three bits, as required to fit the 12-bit complex format. Whenever the shift values are changed, the former results of operations 904, 910, 914 and 916 are reset. e.g., set to zero, as indicated in operation 908, and accumulation starts again.

In operation 910, a first autocorrelation is calculated between the results of the cross-correlation (e.g., the results of operation 904) and the results of the cross-correlation delayed by a time lag that equals one or more time-durations of the synchronization symbol. In some embodiments the time lag in operation 910 equals a single time-duration of the synchronization symbol, so the autocorrelation is calculated between the current results of the cross-correlation and the results of the cross-correlation delayed by one time-duration of the synchronization symbol (L=1). In operation 912, a second autocorrelation is calculated between the results of the cross-correlation (e.g., the results of operation 904) and the results of the cross-correlation delayed by a second time lag that is different from the time lag used in operation 910 and that equals one or more time-durations of the synchronization symbol. In some embodiments the time lag in operation 912 equals two time-durations of the synchronization symbol, so the autocorrelation is calculated between the current results of the cross-correlation and the results of the cross-correlation delayed by two time-durations of the synchronization symbol (L=2). Other time lags may be used.

FIG. 10 further depicts a result of a first autocorrelation 422 performed with a time lag that equals a single time-duration of the synchronization symbol (L=1) and the result of a second autocorrelation 432 performed with a time lag that equals two time-durations of the synchronization symbol (L=2), according to embodiments of the invention. For example, part 426 of the result of the first autocorrelation 422 is a result of an autocorrelation between parts 416 (the current result of the cross correlation) and part 414 (the results of the cross-correlation delayed by one time-duration of the synchronization symbol) and part 428 of the result of the first autocorrelation 422 is a result of an autocorrelation between parts 418 (the current result of the cross correlation) and part 416 (the results of the cross-correlation delayed by one time-duration of the synchronization symbol). Part 438 of the result of the second autocorrelation 432 is a result of an autocorrelation between parts 418 (the current result of the cross correlation) and part 414 (the results of the cross-correlation delayed by two time-durations of the synchronization symbol).

In operation 914 the results of operation 910 are accumulated to obtain a first coarse synchronization window, e.g., once part 428 is calculated, parts 426 and 428 are accumulated, etc. In operation 916 the results of operation 912 are accumulated to obtain a second coarse synchronization window, e.g., once part 434 is calculated, parts 434 and 438 are accumulated, etc.

In operation 918, the results of accumulations performed in operations 914 and 916. e.g., the first and second coarse synchronization windows, may be analyzed to detect presence of the synchronization symbol in the received signal. For example, the first and second coarse synchronization windows may be analyzed to detect a peak as disclosed herein. If a peak is detected, CFO and timing misalignment (or timing drift) may be calculated, as indicated in operation 920 and used for synchronizing and receiving transmission, as indicated in operation 930.

If a peak is not detected in operation 918, then in operation 919 it may be determined if a predetermined number of accumulations have occurred in operations 914 and 916, e.g., if accumulations were performed over sufficient number of cycles (e.g., 24, 32, 40 cycles, etc.). If not. e.g., if the number of cycles is smaller than the predetermined number of accumulations, then the method may return to operation 902 to obtain another part of the sampled received signal. If the number of cycles equals the predetermined number of accumulations, then the method moves to operations 922 and 924. In operations 922 and 924, each of the coarse synchronization windows may be fileted using an IIR filter to obtain a plurality of filtered synchronization windows. For example, in operation 922, the first coarse synchronization window may be fileted using an IIR filter to obtain a first filtered synchronization window, and in operation 924 the second coarse synchronization window may be fileted using an IIR filter to obtain a second filtered synchronization window.

In operation 926, the filtered synchronization windows may be analyzed to detect presence of the synchronization symbol in the received signal. For example, the first and second filtered synchronization windows may be analyzed to detect a peak as disclosed herein. If a peak is detected. CFO and timing misalignment (or timing drift) may be calculated, as indicated in operation 920 and used for synchronizing and receiving transmission, as indicated in operation 930. If a peak is not detected than the coarse synchronization windows (e.g., the results of operations 914 and 916) may be reset, e.g., set to zero, as indicated in operation 928, and the method returns to operation 902. It should be readily understood that while embodiments of the method are presented in FIG. 9 with two time lags of L=1 and L=2, this is not mandatory and other time lags may be used.

Embodiments of the invention may be implemented for example as a logic circuit on an integrated circuit (IC), for example, by constructing synchronization module 114, in integrated chip or as a part of an chip, such as an application specific integrated circuit (ASIC), an field programmable gate array (FPGA), a central processing unit (CPU), a digital signal processor (DSP), a microprocessor, a controller, a processor, a chip, a microchip, etc.

According to embodiments of the present invention, some units e.g., synchronization module 114, may be implemented in a logic circuit provided in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILDGATES® synthesis tool available from, inter alia, Cadence Design Systems, Inc. An ASIC, an FPGA, or other integrated circuit (IC) may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by an arithmetic unit of a processor (e.g., arithmetic unit 1712 of processor 1710) carry out embodiments of the invention. Processor 1710 and arithmetic unit 1712 may be configured to carry out embodiments described herein by for example executing software or instructions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for synchronizing to a received signal in an impulse radio ultra-wide band (IR-UWB) receiver, the method comprising:
sampling the received signal in a frequency that is less than a Nyquist frequency of the received signal;
for each part of the sampled received signal that is equal in length to a synchronization symbol:
calculating a cross-correlation between the synchronization symbol and the part of the sampled received signal that is equal in length to the synchronization symbol to generate results of the cross-correlation;
calculating a plurality of autocorrelations, wherein each autocorrelation is performed between the results of the cross-correlation and the results of the cross-correlation delayed by a time lag that equals one or more time-durations of the synchronization symbol;
accumulating the results of each of the plurality of autocorrelations to obtain at least one coarse synchronization window;
analyzing the at least one coarse synchronization window to detect presence of the synchronization symbol in the received signal; and
synchronizing to the received signal based on the detected synchronization symbol in the received signal.

2. The method of claim 1, wherein the sampling frequency is lower than one fourth of the frequency of the received signal.

3. The method of claim 1, wherein analyzing the at least one coarse synchronization window comprises finding a peak in the at least one coarse synchronization window and determining that the synchronization symbol is present if a peak is detected.

4. The method of claim 1, wherein synchronizing comprises:
calculating a carrier frequency offset (CFO) between the received signal and a local clock based on a phase of the at least one coarse synchronization window;
calculating a timing misalignment between the at least one coarse synchronization window and a location of the synchronization symbol; and
compensating for the CFO and the timing misalignment.

5. The method of claim 1, wherein accumulating the results of each of the plurality of autocorrelations further comprises, for every predetermined number of accumulations:
filtering the at least one coarse synchronization window using an infinite impulse response (IIR) filter to obtain a filtered coarse synchronization window;
resetting the at least one coarse synchronization window, and
wherein analyzing at least one coarse synchronization window further comprises analyzing the filtered coarse synchronization window.

6. The method of claim 1, wherein calculating the autocorrelation comprises:
calculating a first autocorrelation between the results of the cross-correlation and the results of the cross-correlation delayed by a time lag that equals the time-duration of the synchronization symbol to obtain a first autocorrelation window; and
calculating a second autocorrelation between the results of the cross-correlation and the results of the cross-correlation delayed by a time lag that equals two time-duration of the synchronization symbol to obtain a second autocorrelation window, and wherein accumulating the results comprises:
accumulating the results of the first autocorrelation to obtain a first coarse synchronization window; and
accumulating the results of the second autocorrelation to obtain a second coarse synchronization window.

7. The method of claim 6, comprising:
calculating a carrier frequency offset (CFO) between the received signal and a local clock based on a phase of the second coarse synchronization window; and
resolving ambiguity in the calculated CFO using the phase of the first coarse synchronization window.

8. The method of claim 6, wherein analyzing the at least one coarse synchronization window comprises, for each accumulation of the results of the first autocorrelation:
for each sample in the first coarse synchronization window:
summing values of the first coarse synchronization window in a cyclic window of a first number of samples around the sample to obtain a first local sum;
dividing an amplitude of the first local sum by an average amplitude of the first coarse synchronization window to obtain a first local sum to average value; and
determining that a first peak exists for the sample if the first local sum to average value accedes a first threshold, and
for each sample in the second coarse synchronization window:
summing values of the second coarse synchronization window in a cyclic window of the first number of samples around the sample to obtain a second local sum;
dividing an amplitude of the second local sum by an average amplitude of the second coarse synchronization window to obtain a second local sum to average value; and
determining that a second peak exists for the sample if the second local sum to average value accedes a second threshold, and
determining that the synchronization symbol is present if a first peak and a second peaks are detected.

9. The method of claim 8, comprising determining that the synchronization symbol is present if in addition to the first peak and the second peak being detected, the phase of the first coarse synchronization window and the phase of the second coarse synchronization window match, if the index of the first peak and the index of the second peak match and if the phase of the first coarse synchronization window and the phase of the second coarse synchronization window converge as the results of the autocorrelations are accumulated.

10. The method of claim 8, wherein the first threshold and the second threshold decrease as the number of accumulated symbols increase.

11. The method of claim 1, wherein a length of each of the plurality of autocorrelations equals a length of the synchronization symbol.

12. A method for synchronizing to a received signal in an ultra-wide band (UWB) receiver, the method comprising:
sampling the received signal in a frequency that is less than a Nyquist frequency of the received signal;
for each time-duration of a synchronization symbol:
calculating a cross-correlation between the sampled received signal and the synchronization symbol;
calculating an autocorrelation between the results of the cross-correlation and the results of the cross-correlation delayed by a time-durations of the synchronization symbol to obtain a first autocorrelation window;
calculating an autocorrelation between the results of the cross-correlation and the results of the cross-correlation delayed by two time-durations of synchronization symbol to obtain a second autocorrelation window;
accumulating the first autocorrelation windows to obtain a first coarse synchronization window;
detecting peaks in the first coarse synchronization window;
accumulating the second autocorrelation window to obtain a second coarse synchronization window; and
detecting peaks in the second coarse synchronization window;
for each number of time-durations of the synchronization symbol:
filtering the first coarse synchronization window using an IIR filter to obtain a first filtered synchronization window;
resetting the first coarse synchronization window;
detecting peaks in the first filtered synchronization window;
filtering the second coarse synchronization window using the IIR filter to obtain a second filtered synchronization window;
resetting the first coarse synchronization window; and
detecting peaks in the second filtered synchronization window; and
analyzing the amplitude and phase of the detected peaks against at least one pass criteria to determine that the peaks represent a detected synchronization symbol; and
synchronizing to the received symbol based on the detected synchronization symbol in the received signal.

13. The method of claim 12, wherein synchronizing comprises:
calculating a carrier frequency offset (CFO) between the received signal and a local clock based on a phase of the first coarse synchronization window and the second coarse synchronization window;
calculating a timing misalignment between the at least one coarse synchronization window and a location of the synchronization symbol; and
compensating for the CFO and the timing misalignment.

14. A logic circuit in a processor comprising:
a memory; and
a logic circuit configured to:
sample a received signal in a frequency that is less than a Nyquist frequency of the received signal;
for each part of the sampled received signal that is equal in length to a synchronization symbol:
calculate a cross-correlation between the synchronization symbol and the part of the sampled received signal that is equal in length to the synchronization symbol to generate results of the cross-correlation;
calculate a plurality of autocorrelations, wherein each autocorrelation is performed between the results of the cross-correlation and the results of the cross-correlation delayed by a time lag that equals one or more time-durations of the synchronization symbol;

accumulate the results of each of the plurality of autocorrelations to obtain at least one coarse synchronization window;

analyze the at least one coarse synchronization window to detect presence of the synchronization symbol in the received signal; and synchronize to the received signal based on the detected synchronization symbol in the received signal.

15. The logic circuit of claim 14, wherein analyzing the at least one coarse synchronization window comprises finding a peak in the at least one coarse synchronization window and determining that the synchronization symbol is present if a peak is detected.

16. The logic circuit of claim 14, wherein the logic circuit is configured to synchronize to the received signal by:

calculating a carrier frequency offset (CFO) between the received signal and a local clock based on a phase of the at least one coarse synchronization window;

calculating a timing misalignment between the at least one coarse synchronization window and a location of the synchronization symbol; and compensating for the CFO and the timing misalignment.

17. The logic circuit of claim 14, wherein the logic circuit is configured to accumulate the results of each of the plurality of autocorrelations further by, for every predetermined number of accumulations:

filtering the at least one coarse synchronization window using an infinite impulse response (IIR) filter to obtain a filtered coarse synchronization window;

resetting the at least one coarse synchronization window, and wherein analyzing at least one coarse synchronization window further comprises analyzing the filtered coarse synchronization window.

18. The logic circuit of claim 14, wherein the logic circuit is configured to calculate the autocorrelation by:

calculating a first autocorrelation between the results of the cross-correlation and the results of the cross-correlation delayed by a time lag that equals the time-duration of the synchronization symbol to obtain a first autocorrelation window; and calculating a second autocorrelation between the results of the cross-correlation and the results of the cross-correlation delayed by a time lag that equals two time-duration of the synchronization symbol to obtain a second autocorrelation window, and wherein accumulating the results comprises:

accumulating the results of the first autocorrelation to obtain a first coarse synchronization window;

accumulating the results of the second autocorrelation to obtain a second coarse synchronization window;

calculating a carrier frequency offset (CFO) between the received signal and a local clock based on a phase of the second coarse synchronization window; and resolving ambiguity in the calculated CFO using the phase of the first coarse synchronization window.

19. The logic circuit of claim 14, wherein the logic circuit is configured to analyze the at least one coarse synchronization window by, for each accumulation of the results of the first autocorrelation:

for each sample in the first coarse synchronization window:

summing values of the first coarse synchronization window in a cyclic window of a first number of samples around the sample to obtain a first local sum;

dividing an amplitude of the first local sum by an average amplitude of the first coarse synchronization window to obtain a first local sum to average value; and determining that a first peak exists for the sample if the first local sum to average value accedes a first threshold, and for each sample in the second coarse synchronization window:

summing values of the second coarse synchronization window in a cyclic window of the first number of samples around the sample to obtain a second local sum;

dividing an amplitude of the second local sum by an average amplitude of the second coarse synchronization window to obtain a second local sum to average value; and determining that a second peak exists for the sample if the second local sum to average value accedes a second threshold, and determining that the synchronization symbol is present if a first peak and a second peaks are detected, wherein the first threshold and the second threshold decrease as the number of accumulated symbols increase.

20. The logic circuit of claim 14, wherein the logic circuit is configured to determine that the synchronization symbol is present if in addition to the first peak and the second peak being detected, the phase of the first coarse synchronization window and the phase of the second coarse synchronization window match, if the index of the first peak and the index of the second peak match and if the phase of the first coarse synchronization window and the phase of the second coarse synchronization window converge as the results of the autocorrelations are accumulated.

* * * * *